United States Patent
Meyer Timmerman Thijssen et al.

(10) Patent No.: US 10,690,808 B2
(45) Date of Patent: Jun. 23, 2020

(54) METASURFACE LIGHT-RECYCLING COLOR FILTER FOR LCD DISPLAY

(71) Applicant: Applied Materials, Inc., Santa Clara, CA (US)

(72) Inventors: Rutger Meyer Timmerman Thijssen, Sunnyvale, CA (US); Robert Jan Visser, Menlo Park, CA (US); Tapashree Roy, Howah (IN)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

(21) Appl. No.: 16/105,780

(22) Filed: Aug. 20, 2018

(65) Prior Publication Data
US 2019/0129243 A1    May 2, 2019

Related U.S. Application Data

(60) Provisional application No. 62/580,000, filed on Nov. 1, 2017.

(51) Int. Cl.
G02B 1/00       (2006.01)
(52) U.S. Cl.
CPC .......... G02B 1/002 (2013.01); G02F 2203/34 (2013.01)
(58) Field of Classification Search
CPC ........... G02F 1/133528; G02F 2203/34; G02B 1/002
See application file for complete search history.

(56) References Cited

U.S. PATENT DOCUMENTS

| 6,097,456 A | 8/2000 | Wang |
| 6,317,264 B1 | 11/2001 | Li et al. |
| 9,547,107 B2 | 1/2017 | Guo et al. |
| 9,651,817 B1* | 5/2017 | Foote ................ G02F 1/133514 |
| 2004/0174477 A1* | 9/2004 | Okamoto .......... G02F 1/133528 349/113 |
| 2009/0283768 A1 | 11/2009 | Wang et al. |
| 2011/0149217 A1* | 6/2011 | Yoon ..................... G02B 5/008 349/106 |
| 2012/0057106 A1 | 3/2012 | Park et al. |
| 2012/0154793 A1 | 6/2012 | Pryce et al. |

(Continued)

FOREIGN PATENT DOCUMENTS

WO    2016064813 A1    4/2016

OTHER PUBLICATIONS

International Search Report and Written Opinion dated Dec. 19, 2018 for Application No. PCT/US2018/049328.

*Primary Examiner* — Thanh Nhan P Nguyen
(74) *Attorney, Agent, or Firm* — Patterson + Sheridan, LLP

(57) ABSTRACT

Aspects disclosed herein relate to color filters for display devices, and more specifically to color filters for transmitting or reflecting and recycling colors of light in liquid crystal display devices. In one aspect, a metasurface is formed between two polarizers in an LCD device. In another aspect, a metasurface is formed on a white light guide of an LCD device. The metasurface is formed to transmit desired color(s) of light and to reflect undesired color(s) of light back into the light guide to be recycled and passed through the LCD device elsewhere. Using the color filter to recycle reflected colors of light increases the efficiency of the display device, such as the LCD device.

20 Claims, 3 Drawing Sheets

(56) References Cited

U.S. PATENT DOCUMENTS

| | | | |
|---|---|---|---|
| 2012/0169966 A1* | 7/2012 | Lu ......................... | G02B 27/44 |
| | | | 349/62 |
| 2012/0236235 A1* | 9/2012 | Ishiguro ............... | G02B 5/3033 |
| | | | 349/96 |
| 2017/0075038 A1 | 3/2017 | Boulais et al. | |
| 2018/0101056 A1* | 4/2018 | Lee ................... | G02F 1/133617 |

* cited by examiner

METASURFACE LIGHT-RECYCLING COLOR FILTER FOR LCD DISPLAY

CROSS-REFERENCE TO RELATED APPLICATIONS

This application claims benefit of U.S. Provisional Patent Application Ser. No. 62/580,000, filed on Nov. 1, 2017, which is herein incorporated by reference in its entirety.

BACKGROUND

Field

Aspects disclosed herein relate to color filters for display devices, and more specifically to color filters for transmitting or reflecting and recycling colors of light in liquid crystal display devices.

Description of the Related Art

Liquid crystal displays (LCDs) are one type of flat-panel display used in a wide variety of applications, including computer monitors, televisions, instrument panels, and portable consumer devices such as smartphones, mobile phones, digital cameras and watches. An LCD device generally includes a thin film transistor (TFT) layer having liquid crystals adjacent thereto and a color filter layer, which are spaced apart from one another and aligned between two electrodes and two perpendicularly-oriented polarizers. LCD devices use the light-modulating properties of the liquid crystals, in combination with a backlight or reflector, to produce color or monochrome images. Specifically, LCD devices generally use several layers of optical devices to colorize, polarize, and shutter light from a backlight. Inefficiencies emerge at each layer of the LCD device, as well as at every step of the image production process.

For example, various inefficiencies result from conventionally-used color filter layers. Absorptive color pixels, typically red, green, and blue absorbing pixels, are commonly used for color filtering in LCD devices. However, absorptive color pixels reduce overall LCD device efficiency and brightness due to significant light loss through the absorption.

Therefore, there is a need for improved color filtering apparatus and methods for display devices, such as LCD devices.

SUMMARY

Aspects disclosed herein relate to color filters for display devices, and more specifically to color filters for transmitting or reflecting and recycling colors of light in liquid crystal display devices. In one aspect, a metasurface is formed between two polarizers in an LCD device. In another aspect, a metasurface is formed on a white light guide of an LCD device. The metasurface is formed to transmit desired color(s) of light and to reflect undesired color(s) of light back into the light guide to be recycled and passed through the LCD device elsewhere. Using the color filter to recycle reflected colors of light increases the efficiency of the display device, such as the LCD device.

In one aspect, a liquid crystal display device is disclosed. The liquid crystal display device includes a first polarizer, a second polarizer, a thin film transistor layer having a layer of liquid crystals arranged in a pixel array adjacent thereto positioned between the first polarizer and the second polarizer, and a metasurface positioned between the layer of liquid crystals and the second polarizer.

In another aspect, a liquid crystal display device is disclosed. The liquid crystal display device includes a metasurface disposed over a light guide, a single polarizer, and a thin film transistor layer having a layer of liquid crystals arranged in a pixel array adjacent thereto positioned between the metasurface and the single polarizer.

In another aspect a liquid crystal display device is disclosed. The liquid crystal display device includes a first polarizer, a second polarizer, a thin film transistor layer having a layer of liquid crystals arranged in a pixel array adjacent thereto positioned between the first polarizer and the second polarizer, and a color filter positioned between the layer of liquid crystals and the second polarizer, the color filter being configured to transmit certain colors of light, reflect certain colors of light, and recycle the reflected colors of light for use elsewhere in the liquid crystal display device.

In another aspect a liquid crystal display device is disclosed. The liquid crystal display device includes a color filter disposed over a light guide, the color filter being configured to transmit certain colors of light, reflect certain colors of light, and recycle the reflected colors of light for use elsewhere in the liquid crystal display device, a single polarizer, and a thin film transistor layer having a layer of liquid crystals arranged in a pixel array adjacent thereto positioned between the color filter and the single polarizer.

In yet another aspect, a method for manufacturing a liquid crystal display device is disclosed. The method includes depositing a layer of liquid crystals over a thin film transistor, depositing a polarizer over at least a first side of the layer of liquid crystals, and depositing a metasurface over a second side of the layer of liquid crystals, the second side being opposite the first side. The metasurface includes a first portion having a first pattern of features, a second portion having a second pattern of features, and a third portion having a third pattern of features.

BRIEF DESCRIPTION OF THE DRAWINGS

So that the manner in which the above recited features of the present disclosure can be understood in detail, a more particular description of the disclosure, briefly summarized above, may be had by reference to examples, some of which are illustrated in the appended drawings. It is to be noted, however, that the appended drawings illustrate only typical examples of this disclosure and are therefore not to be considered limiting of its scope, for the disclosure may admit to other equally effective examples.

To facilitate understanding, identical reference numerals have been used, wherever possible, to designate identical elements that are common to the Figures. Additionally, elements of one example may be advantageously adapted for utilization in other examples described herein.

DETAILED DESCRIPTION

Aspects disclosed herein relate to color filters for display devices, and more specifically to color filters for transmitting or reflecting and recycling colors of light in liquid crystal display devices. In one aspect, a metasurface is formed between two polarizers in an LCD device. In another aspect, a metasurface is formed on a white light guide of an LCD device. The metasurface is formed to transmit desired color(s) of light and to reflect undesired color(s) of light back into the light guide to be recycled and passed through the LCD device elsewhere. Using the color filter to recycle reflected colors of light increases the efficiency of the display device, such as the LCD device.

The present disclosure refers to "desired colors" and "undesired colors." "Desired colors" generally means those colors that are to be transmitted at a particular pixel as part of the image to be projected by the display device, such as an LCD device. "Undesired colors" generally means those colors that are not to be transmitted at the particular pixel as part of the image to be projected.

Additionally, metasurfaces are described herein as one example of a color filter suitable for transmitting and reflecting desired and undesired colors of light, respectively. However, other suitable color filters, which are capable of reflecting colors undesired for that particular pixel and directing them back to a light guide or other source for recycling such that they are transmitted through another portion of the display device, are also contemplated herein. By utilizing a color filter suitable for recycling colors of light, the overall device efficiency is increased.

Figure 1:
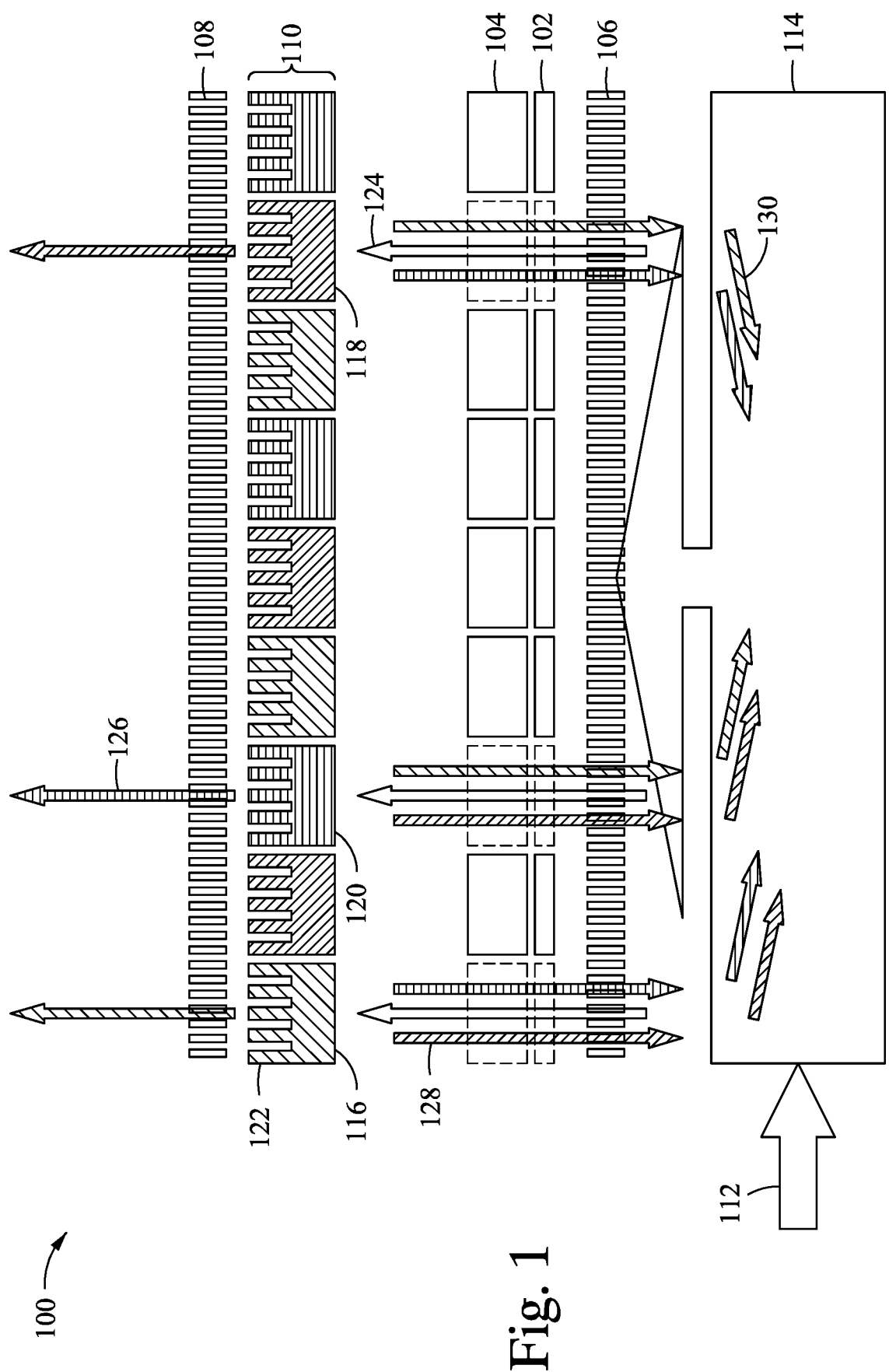
FIG. 1 is an LCD device according to one aspect of the present disclosure.

FIG. 1 is an LCD device 100 according to one aspect of the present disclosure. The LCD device 100 generally includes a TFT layer 102 having a layer of liquid crystals 104 arranged in a pixel array adjacent thereto. The TFT layer 102 and the layer of liquid crystals 104 are positioned between a first polarizer 106 and a second polarizer 108. The LCD device 100 further includes a metasurface 110 positioned between the layer of liquid crystals 104 and one of the first polarizer 106 and the second polarizer 108. The metasurface 110 is an interface having structures thereon that impose particular phase shifts on incoming light such that the light is either transmitted through or reflected off of the interface, and therefore serves as the color filter of the LCD device 100. As shown in FIG. 1, the metasurface 110 is positioned between the layer of liquid crystals 104 and the second polarizer 108. The metasurface 110 may alternatively be positioned between the first polarizer 106 and the layer of liquid crystals 104. A light source 112 is coupled to the LCD device 100 through a light guide 114. As shown in FIG. 1, the metasurface 110 includes a first portion 116, a second portion 118, and a third portion 120, and includes one or more features 122 thereon. Each portion of the metasurface 110 generally corresponds to a pixel, which comprises part of the image to be projected.

The metasurface 110 is generally any suitable dielectric or other optical material. Suitable metasurface materials generally include any materials with a refractive index above 1.8. Suitable materials include, but are not limited to, gallium phosphide (GaP), amorphous silicon (aSi), crystalline silicon (cSi), gallium nitride (GaN), silicon nitride (SiN), and Azo compounds. In one aspect, the metasurface 110 comprises an oxide, such as titanium dioxide ($TiO_2$). The one or more features 122 are nanopatterned onto the metasurface 110. As described above, it is the nanopatterning of the one or more features 122 that provides for transmission or reflection of certain colors of light. The nanopatterning is generally performed by any suitable nano-patterning process, including but not limited to, nano-imprint lithography, electron beam (e-beam) lithography, photolithography, and interference lithography. Additionally, multilayer stack deposition is a suitable method for patterning the metasurface.

In one aspect, the pattern of the one or more features 122 is different on each of the first portion 116, the second portion 118, and the third portion 120. For example, the one or more features 122 on each of the first portion 116, the second portion 118, and the third portion 120 may have different heights, widths, and/or shapes while the first portion 116, the second portion 118, and the third portion 120 are identical, such as in size, shape, and/or material. In another example, the height, width, and/or shape of the one or more features 122 on each of the first portion 116, the second portion 118, and the third portion 120 may be the same while the first portion 116, the second portion 118, and the third portion 120 are different, such as differently sized or shaped or including a different material. In yet another example, the one or more features 122 on each of the first portion 116, the second portion 118, and the third portion 120 may have different heights, widths, and/or shapes and the first portion 116, the second portion 118, and the third portion 120 may be different, such as differently sized or shaped or including a different material. Moreover, the pattern of the one or more features 122 on each of the first portion 116, the second portion 118, and the third portion 120 may be regular or irregular across the surface of each of the respective portions. In another aspect, the pattern of the one or more features 122 is uniform across the metasurface 110. In addition, the metasurface 110 may be configured, by patterning or otherwise, to also control the range of angles into which the colors of light are transmitted such that the field of view of the overall device is narrowed or broadened to better suit the application of the LCD device 100. FIG. 1 shows the metasurface 110 having trench-like and tube-like features thereon. However, any suitable feature is also contemplated herein.

In operation, light from the light source 112 is introduced to the LCD device 100 through the light guide 114. The light is directed from the light guide 114 to the first polarizer 106, which directs polarized light through the pixels of the layer of liquid crystals 104 that are in an "on" position, as shown by arrows 124. The polarized light then interacts with the metasurface 110. The one or more features 122 contribute to the ability of the metasurface 110 to transmit desired color(s) and reflect undesired color(s) for the image to be projected. Accordingly, the first, second, and third portions 116, 118, and 120, respectively, of the metasurface 110 are used to transmit desired color(s) for forming the image, as shown by arrows 126, and to reflect undesired color(s) back to the light guide 114, as shown by arrows 128, so that the reflected light may be recycled and directed to another portion of the metasurface 110 for transmission in the image, as shown by arrows 130. The transmitted light shown by arrows 126 is directed through the second polarizer 108 and projected as part of the imaged displayed by the LCD device 100. In one aspect, the reflected light is recycled through the light guide 114 and re-projected back through the first polarizer 106, TFT layer 102, layer of liquid crystals 104, metasurface 110, and second polarizer 108.

In the example shown in FIG. 1, the first portion 116 corresponds to a first color, such as red. The second portion 118 corresponds to a second color, such as green. The third portion 120 corresponds to a third color, such as blue. In the example of red, green, and blue, the first portion 116 is patterned and configured to transmit red light for the respective pixel of the image, while reflecting blue and green light, the second portion 118 is configured to transmit green light for the respective pixel of the image, while reflecting blue and red light. The third portion 120 is configured to transmit blue light for the respective pixel of the image, while reflecting red and green light.

Figure 2:
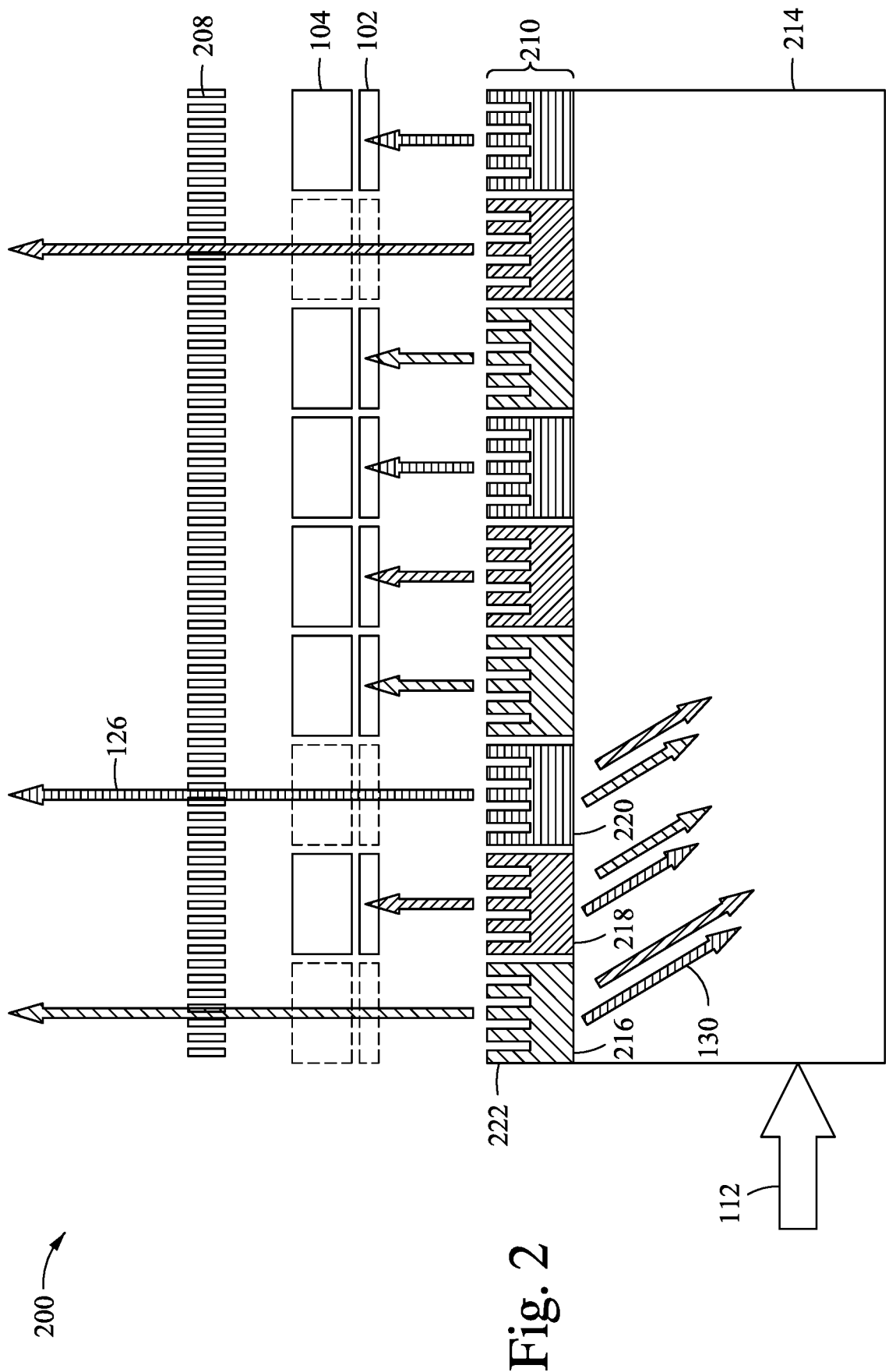
FIG. 2 is an LCD device according to another aspect of the present disclosure.

FIG. 2 is an LCD device 200 according to another aspect of the present disclosure. Like the LCD device 100, the LCD device 200 includes a metasurface 210 for color filtering. However, the arrangement of the LCD device 200 is different than the LCD device 100. More particularly, the metasurface 210 is positioned between the light guide 214 and the TFT layer 102 having a layer of liquid crystals 104 adjacent thereto. In the aspect shown in FIG. 2, the metasurface 210 is disposed on and in contact with the light guide 214. However, in further aspects, it is contemplated that the metasurface 210 is disposed over the light guide 214, for example, a distance above the light guide 214. The LCD device 200 only includes a single polarizer 208 because the position of the metasurface 210, in combination with the structure of the metasurface 210, eliminates the need for two polarizers. Like the metasurface 110, the metasurface 210 includes at least a first portion 216, a second portion 218, and a third portion 220, and includes a plurality of features 222 thereon. Each portion of the metasurface 210 generally corresponds to a pixel, which comprises part of the image to be projected.

The metasurface 210 is generally any suitable dielectric or other optical material. Suitable metasurface materials generally include any materials with a refractive index above 1.8. Suitable materials include, but are not limited to, gallium phosphide (GaP), amorphous silicon (aSi), crystalline silicon (cSi), gallium nitride (GaN), silicon nitride (SiN), and Azo compounds. In one aspect, the metasurface 210 comprises an oxide, such as titanium dioxide ($TiO_2$). The one or more features 222 are nanopatterned onto the metasurface 210. As described above, it is the nanopatterning of the one or more features 222 that provides for polarization of the incoming light and transmission or reflection of certain colors of light through the metasurface 210. The nanopatterning is generally performed by any suitable nanopatterning process, including but not limited to, nanoimprint lithography, e-beam lithography, photolithography, and interference lithography. Additionally, multilayer stack deposition is a suitable method for patterning the metasurface.

In one aspect, the pattern of the one or more features 222 is different on each of the first portion 216, the second portion 218, and the third portion 220. For example, the one or more features 222 on each of the first portion 216, the second portion 218, and the third portion 220 may have different heights, widths, and/or shapes while the first portion 216, the second portion 218, and the third portion 220 are identical, such as in size, shape, and/or material. In another example, the height, width, and/or shape of the one or more features 222 on each of the first portion 216, the second portion 218, and the third portion 220 may be the same while the first portion 216, the second portion 218, and the third portion 220 are different, such as differently sized or shaped or including a different material. In yet another example, the one or more features 222 on each of the first portion 216, the second portion 218, and the third portion 220 may have different heights, widths, and/or shapes and the first portion 216, the second portion 218, and the third portion 220 may be different, such as differently sized or shaped or including a different material. Moreover, the pattern of the one or more features 222 on each of the first portion 216, the second portion 218, and the third portion 220 may be regular or irregular across the surface of each of the respective portions. In another aspect, the pattern of the one or more features 222 is uniform across the metasurface 210. In addition, the metasurface 210 may be configured, by patterning or otherwise, to also control the range of angles into which the colors of light are transmitted such that the field of view of the overall device is narrowed or broadened to better suit the application of the LCD device 200. Even further, the metasurface 210 is also configured to transmit only one polarization of light, eliminating the need for one polarizer such that the LCD device 200 includes only the single polarizer 208. FIG. 2 shows the metasurface 110 having trench-like and tube-like features thereon. However, any suitable feature is also contemplated herein.

Additionally, the light guide 214 may include one or more structures to couple the light out so that light is propagating through total internal reflection (TIR). The LCD device 200 may also include additional structures to couple out the light again.

In operation, light from the light source 112 is introduced to the LCD device 200 through the light guide 214. The light is first directed through the metasurface 210, which polarizes the light, and transmits desired color(s) and reflects undesired color(s) for the image to be projected from the LCD device 200. Specifically, the first, second, and third portions 216, 218, and 220, respectively, of the metasurface 210 are used to transmit desired color(s) for forming the image, as shown by arrows 126, and to reflect undesired color(s) back to the light guide 214, so that the reflected light may be recycled and directed to another portion of the metasurface 210 for transmission in the image, as shown by arrows 130. The transmitted light shown by arrows 126 is then transmitted through the portions, or pixels, of the layer of liquid crystals 104 that are in an "on" position and projected as part of the imaged displayed by the LCD device 200. The light that is transmitted to the portions, or pixels, of the layer of liquid crystals 104 that are in an "off" position is then also recycled for direction to another portion of the metasurface 210.

While first, second, and third portions are shown in FIGS. 1 and 2, the metasurfaces 110 and 210 generally include one portion or any number of portions suitable for transmitting desired light color(s) and reflecting undesired light color(s) such that they are recycled and may be transmitted elsewhere through the LCD device 100 or 200.

Figure 3:
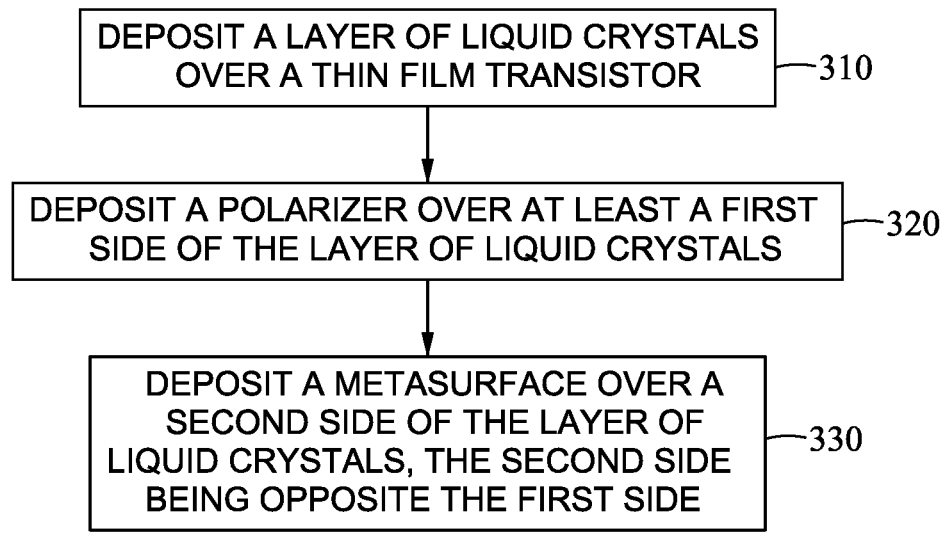
FIG. 3 is a process flow of a method for forming an LCD device according to aspects of the present disclosure.

FIG. 3 is a process flow of a method 300 for manufacturing an LCD device. The method 300 begins at operation 310 by depositing a layer of liquid crystals over a thin film transistor. At operation 320, a polarizer is deposited over at least a first side of the layer of liquid crystals. At operation 330, a metasurface is deposited over a second side of the layer of liquid crystals, the second side being opposite the first side.

The above-described aspects provide some examples of color filters that may be used for transmitting desired light colors, and reflecting and recycling undesired light colors in devices, such as LCDs. Additional metasurfaces or other color filter structures are also contemplated herein. One example of another color filter contemplated herein is a laterally patterned metasurface having resonant pillar-like structures of $TiO_2$ thereon. Yet another color filter contemplated herein is a multilayered metasurface, such as multilayered metasurface having multilayers of $TiO_2$ and silver (Ag). The multilayered metasurface may also include one or more lateral structures thereon. Further examples of color filters contemplated herein are plasmonic metasurfaces.

Benefits of the present disclosure include increased device efficiency, decreased light loss, increased brightness, and reduced manufacturing costs. More specifically, because the metasurface reflects the light that is not transmitted at a particular portion back to the light guide, the reflected light is recycled and directed to other portions of the LCD device through which it will be transmitted for projection of the image. Accordingly, the described LCD devices having a metasurface for color filtering therein experience reduced light loss and thus increased efficiency. For example, conventionally-used absorptive color filters lose as much as of ⅔ light during operation. LCD devices described herein emit between 70 percent and 95 percent of the light that is introduced to the device. Therefore, efficiency of the LCD device may be increased up to 3 times. Additionally, using a metasurface for color filtering in the LCD device increases the color purity. Conventionally-used absorptive color pixels are not narrow band and thus limit color purity, whereas metasurfaces are narrow band and increase color purity. The recycling of rejected light and increased color purity provides a brighter display with increased uniformity. Moreover, in aspects in which the metasurface provides polarization and color filtering, the overall cost of the device is reduced because the need for a second polarizer is eliminated. Additionally, elimination of a second polarizer further reduces the light lost through the LCD device because a transition, where light loss usually occurs, has been eliminated from the device structure.

The foregoing aspects described herein relate to using a metasurface for color filtering in display devices, such as LCD devices. It is also contemplated that the described metasurfaces are suitable for replacing the color filters of image sensors. Additionally, the described metasurfaces are suitable for replacing one or more of the color filter and the microlens layer of a chemical metal oxide sensor (CMOS) device.

While the foregoing is directed to examples of the present disclosure, other and further examples of the disclosure may be devised without departing from the basic scope thereof, and the scope thereof is determined by the claims that follow.

What is claimed is:

1. A liquid crystal display device, comprising:
a first polarizer;
a second polarizer;
a thin film transistor layer positioned between the first polarizer and the second polarizer;
a layer of liquid crystals arranged in a pixel array and positioned between the thin film transistor layer and the second polarizer; and
a metasurface positioned between the layer of liquid crystals and the second polarizer, the metasurface consisting of dielectric material, wherein
the metasurface includes a first portion having a base and a first plurality of structures extending from the base of the first portion,
the metasurface includes a second portion having a base and a second plurality of structures extending from the base of the second portion, and
the first plurality of structures have a different size or shape than the second plurality of structures.

2. The liquid crystal display device of claim 1, wherein the first plurality of structures are configured to transmit a first color through the first portion and the second plurality of structures are configured to reflect the first color.

3. The liquid crystal display device of claim 1, wherein the metasurface further includes a third portion having a base and a third plurality of structures extending from the base of the third portion, wherein the third plurality of structures have a different size or shape than the first plurality of structures and the second plurality of structures.

4. The liquid crystal display device of claim 3, wherein the first portion is configured to transmit red light and to reflect green light and blue light.

5. The liquid crystal display device of claim 3, wherein the second portion is configured to transmit green light and to reflect red light and blue light.

6. The liquid crystal display device of claim 3, wherein the third portion is configured to transmit blue light and to reflect red light and green light.

7. The liquid crystal display device of claim 3, wherein the first portion, the second portion, and the third portion are configured to correspond to a first pixel of an image, a second pixel of an image, and a third pixel of an image, respectively.

8. The liquid crystal display device of claim 1, wherein the first plurality of structures comprises a plurality of trenches and a plurality of tubes.

9. The liquid crystal display device of claim 1, wherein the first plurality of structures comprises a plurality of pillars.

10. A liquid crystal display device, comprising:
a metasurface consisting of dielectric material;
a single polarizer;
a thin film transistor layer positioned between the single polarizer and the metasurface; and
a layer of liquid crystals arranged in a pixel array and positioned between the metasurface and the single polarizer, wherein
the metasurface includes a first portion having a base and a first plurality of structures extending from the base of the first portion,
the metasurface includes a second portion having a base and a second plurality of structures extending from the base of the second portion, and
the first plurality of structures have a different size or shape than the second plurality of structures.

11. The liquid crystal display device of claim 10, wherein the metasurface comprises a material having a refractive index of 1.8 or above.

12. The liquid crystal display device of claim 10, wherein the dielectric material is selected from the group consisting of titanium dioxide (TiO2), gallium phosphide (GaP), amorphous silicon (aSi), crystalline silicon (cSi), gallium nitride (GaN), silicon nitride (SiN), and Azo compounds.

13. The liquid crystal display device of claim 10, wherein the first plurality of structures comprises a first nanopattern of features.

14. The liquid crystal display device of claim 13, wherein the second plurality of structures comprises a second nanopattern of features.

15. The liquid crystal display device of claim 14, wherein the metasurface further includes a third portion, the third portion having a base and a third plurality of structures extending from the base of the third portion, wherein the third plurality of structures have a different size or shape than the first plurality of structures and the second plurality of structures.

16. The liquid crystal display device of claim 15, wherein the first portion, the second portion, and the third portion are configured to correspond to a first pixel, a second pixel, and a third pixel of an image to be displayed, respectively.

17. A method for manufacturing a liquid crystal display device, comprising:
forming a layer of liquid crystals over a thin film transistor;
forming a polarizer over a first side of the layer of liquid crystals; and forming a metasurface over a second side of the layer of liquid crystals, the second side being opposite the first side, the metasurface consisting of dielectric material, the metasurface comprising:
- a first portion having a base and a first plurality of structures extending from the base of the first portion; and
- a second portion having a base and a second plurality of structures extending from the base of the second portion, wherein the first plurality of structures have a different size or shape than the second plurality of structures.

18. The method of claim 17, wherein the first portion is configured to transmit red light and to reflect green light and blue light.

19. The method of claim 17, wherein the second portion is configured to transmit green light and to reflect red light and blue light.

20. The method of claim 17, wherein
the metasurface further comprises a third portion
the third portion having a base and a third plurality of structures extending from the base of the third portion,
the third plurality of structures have a different size or shape than the first plurality of structures and the second plurality of structures, and
the third portion is configured to transmit blue light and to reflect red light and green light.

* * * * *